(12) United States Patent
Kolar (10) Patent No.: US 7,264,187 B1
(45) Date of Patent: Sep. 4, 2007

(54) METHOD FOR CONTROLLING THE BLENDING OF DRINKS

(75) Inventor: David J. Kolar, Stow, OH (US)

(73) Assignee: Vita-Mix Corporation, Cleveland, OH (US)

( * ) Notice: Subject to any disclaimer, the term of this patent is extended or adjusted under 35 U.S.C. 154(b) by 309 days.

(21) Appl. No.: 11/132,867

(22) Filed: May 19, 2005

(51) Int. Cl.
*B02C 25/00* (2006.01)

(52) U.S. Cl. .................................. 241/30; 241/DIG. 17

(58) Field of Classification Search .................. 241/30, 241/DIG. 17, 199.12, 282.1; 366/206; 99/348, 99/342, 468, 510, 275; 426/231
See application file for complete search history.

(56) References Cited

U.S. PATENT DOCUMENTS

| | | | |
|---|---|---|---|
| 3,809,325 A * | 5/1974 | Marrie | ..................... 241/278.1 |
| 4,276,750 A | 7/1981 | Kawasumi | |
| 4,528,824 A | 7/1985 | Herbert | |
| 4,588,004 A | 5/1986 | Herbert | |
| 4,653,281 A | 3/1987 | Van Der Veer | |
| 4,681,030 A | 7/1987 | Herbert | |
| 4,962,895 A | 10/1990 | Gallaher | |
| 4,998,677 A | 3/1991 | Gallher | |
| 5,156,297 A | 10/1992 | Engler | |
| 5,323,691 A | 6/1994 | Reese et al. | |
| 5,619,901 A | 4/1997 | Reese et al. | |
| 5,799,567 A | 9/1998 | Dörner | |
| 6,194,013 B1 | 2/2001 | Kolar et al. | |
| 6,342,260 B2 | 1/2002 | Kolar et al. | |
| 2002/0009017 A1 * | 1/2002 | Kolar et al. | ................. 366/206 |

\* cited by examiner

*Primary Examiner*—Faye Francis
(74) *Attorney, Agent, or Firm*—Renner, Kenner, Greive, Bobak, Taylor & Weber (57) ABSTRACT

A method of operating a drink-blending machine to change the operational speed of an ice-shaver motor initiates operation of an ice-shaving process to supply a portion of shaved ice to a pitcher. Accordingly, the ice is moved past a blade to produce shaved ice. According to the rate of ice-shaving, the operational speed of the ice-shaver motor is adjusted. In doing so, the method compensates for dullness of the blade to maintain rate of ice-shaving with a specified range.

9 Claims, 5 Drawing Sheets

METHOD FOR CONTROLLING THE BLENDING OF DRINKS

TECHNICAL FIELD

The present invention relates to a method for controlling the blending of drinks, in particular, drinks made with a portion of liquid and a portion of ice. More particularly, the present invention relates to a method for controlling the blending of drinks, where the operation of an ice-shaving unit is controlled to provide a measured portion of ice. More specifically, the present invention relates to a method for controlling the blending of drinks, where the speed of the motor of the ice-shaving unit can be adjusted to maintain the ice-shaving rate within an acceptable range.

BACKGROUND ART

Very popular beverages today are those commonly referred to as "frozen" drinks whereby a portion of liquid, which often includes a quantity of liquor and flavored drink mix, and a portion of ice are mixed in a blender to create an almost slush-like drink. In the past, the most typical manner to create such drinks required an operator to put a quantity of liquor, flavored drink mix, ice, and possibly other ingredients in the pitcher of a blender, and, thereafter, operate the blender until the frozen drink is perceived to be adequately mixed. The frozen drink is then transferred from the pitcher of the blender to a patron's glass for consumption.

Such a procedure has many disadvantages. For example, this procedure, in the sometimes busy environment of some establishments, requires the constant attention of the operator. Instead of operating the blender, the operator could be giving his or her attention to making other drinks while the frozen drink is being prepared.

Moreover, in the above-described manner, a skilled operator would have difficulty making frozen drinks which are consistent in quantity and quality That is, dependent on the number of drinks to be made, the operator is required to estimate the proper portions of liquid and ice to mix in the blender. If too small a quantity of liquid and ice are blended, the patron's glass will not be filled on the first try, and the operator will be required to blend additional portions of liquid and ice. Or, as often is the case, the operator may blend too large a quantity of liquid and ice, which, if not eventually used, is wasteful to the economic detriment of the establishment. Furthermore, there is no way to assure that the quality of the drink is consistent from drink-to-drink. If patrons have enjoyed a good first drink, they expect that their second drink will be of the same quality, which cannot always happen when the operator is required to "eyeball" the portion of liquid relative to the portion of ice to be blended.

One proposed solution to at least some of the aforementioned problems is to provide a combined ice dispenser and blender whereby the portion of ice supplied is proportioned by weight to the portion of liquid provided in the pitcher. This solution has many advantages. However, operation of the combined ice dispenser and blender will eventually dull the blade used in shaving the ice. Such dullness decreases the ice-shaving rate of the ice dispenser. As such, there is a need to compensate for inconsistencies of the blades to maintain the ice-shaving rate within an acceptable range.

DISCLOSURE OF THE INVENTION

In general, the present invention contemplates a method of operating a drink-blending machine to change the operational speed of an ice-shaver motor, including the steps of initiating operation of an ice-shaving process, providing shaved ice to a pitcher, setting the operational speed of the ice-shaver motor to a default speed plus a potential adjustment factor, determining an ice-shaving rate for the ice-shaving process, if the ice-shaving rate is not within a specified range, then determining the adjustment factor, and using the adjustment factor in repeat operations of the drink-blending machine.

The present invention further contemplates a method of operating a drink-blending machine to change the operational speed of an ice-shaver motor, including the steps of initiating operation an ice-shaving process, providing shaved ice to a pitcher, setting the operational speed of the ice-shaver motor to a default speed plus an adjustment factor, iteratively repeating steps (a), (b), (c), and (d) until a weight difference is greater than a specified weight of shaved ice: (a) determining an ice-shaving rate per cycle, (b) determining a current sample weight, (c) subtracting the tare weight from the current sample weight to determine the weight difference, (d) if the ice-shaving rate per cycle is not within a specified range, then determining an intermediary adjustment factor, determining the adjustment factor using the intermediary adjustment factors, using the adjustment factor in repeat operations of the drink-blending machine, and deactivating the ice-shaving process.

The present invention still further contemplates a method of operating a drink-blending machine to change the operational speed of an ice-shaver motor, including the steps of initiating operation an ice-shaving process, providing shaved ice to a pitcher, setting the operational speed of the ice-shaver motor, iteratively repeating steps (e), (f), (g), and (h) until a weight difference is greater than a specified weight of shaved ice: (e) determining an ice-shaving rate per cycle, (f) determining a current sample weight, (g) subtracting the tare weight from the current sample weight to determine the weight difference, (h) continually adjusting the operational speed of the ice-shaver motor according to an amount of ice-shaving rate error per cycle, then deactivating the ice-shaving process.

PREFERRED EMBODIMENT FOR CARRYING OUT THE INVENTION

Figure 1:
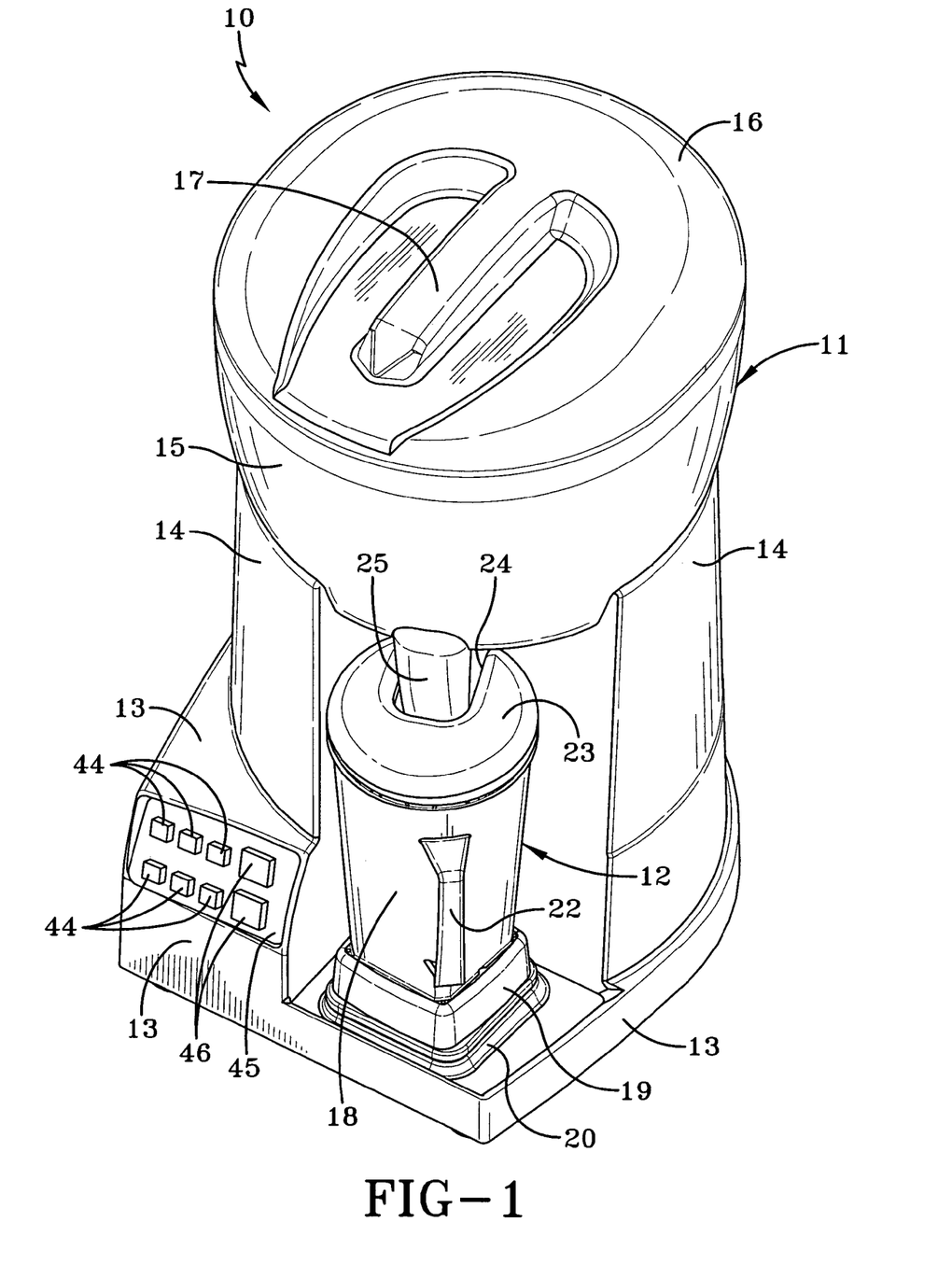
FIG. 1 is a perspective view of an ice shaver and blender device made in accordance with the concepts of the present invention.
Figure 2:
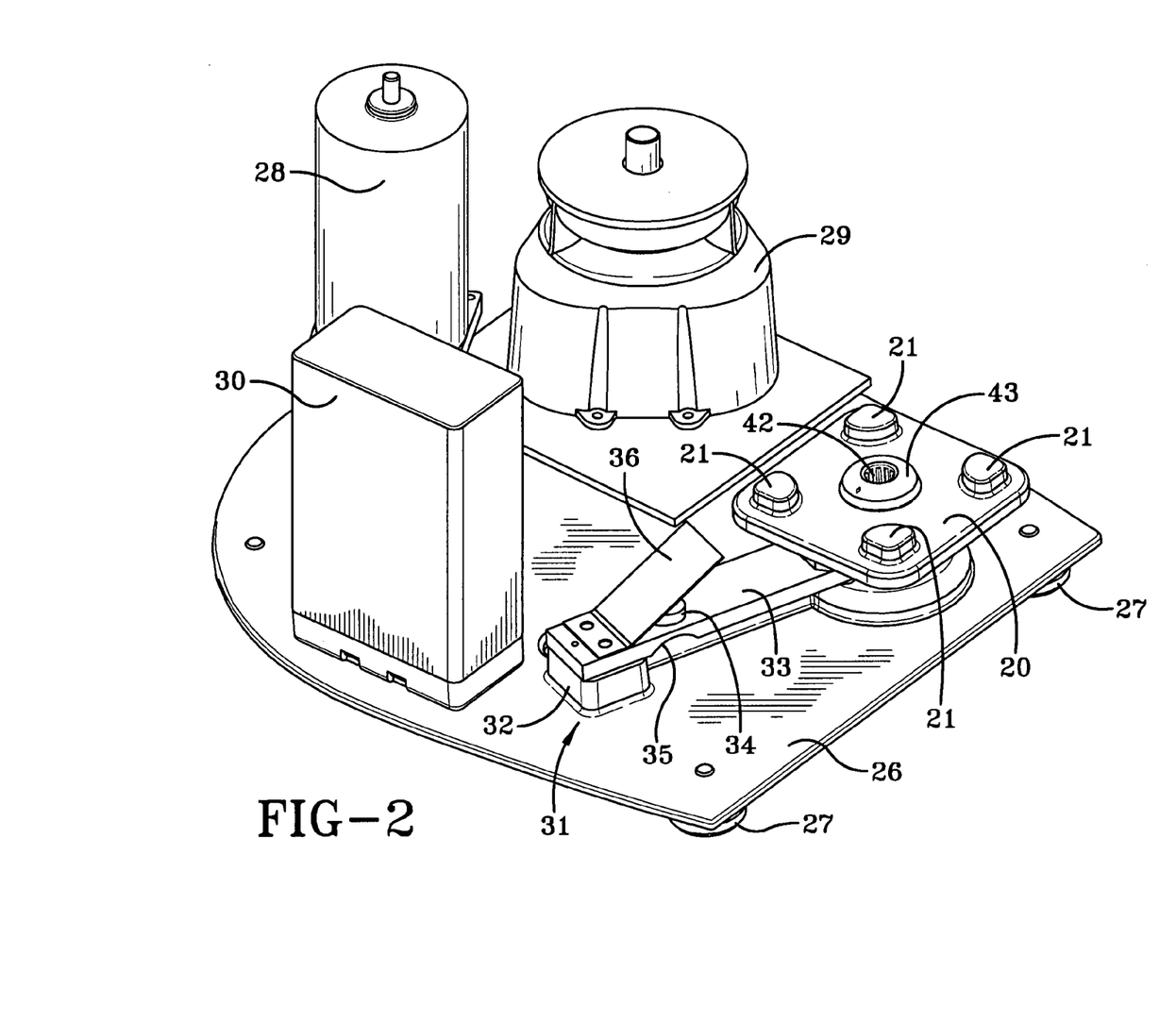
FIG. 2 is a somewhat schematic view of some of the internal components of the device shown in FIG. 1.

A drink-blending machine is generally indicated by the numeral 10 in FIGS. 1 and 2. Drink-blending machine 10 includes two basic components, an ice dispenser preferably in the form of an ice-shaving unit generally indicated by the numeral 11, and a blender assembly generally indicated by the numeral 12. Drink-blending machine 10 also includes a base portion 13 supporting a partially cylindrical pedestal 14. Pedestal 14 supports an ice bin 15 which is part of ice-shaving unit 11, and is adapted to carry a supply of ice used during operation of drink-blending machine 10. A lid 16 is provided to close ice bin 15, and unless otherwise evident, all components of drink-blending machine 10 can be fabricated of any suitable plastic material. For example, it is preferable to form ice bin 15 of a transparent plastic material so that the user can observe the quality of ice maintained therein.

Blender assembly 12 includes a pitcher 18 having a base 19 which is received on and carried by a pad 20. Pad 20 can include various locators 21 generally positioned near the corners thereof to receive a mating structure (not shown) on the bottom of base 19. As seen in FIG. 2, pitcher 18 includes a conventional handle 22 and cover 23. Cover 23 includes a slot 24 (FIG. 1) therein to receive an ice chute 25 therethrough. Chute 25 thus enables ice bin 15 to communicate with pitcher 18, thereby allowing shaved ice to pass from ice-shaving unit 11 into pitcher 18.

Base portion 13 and pedestal 14 internally house the operating components of drink-blending machine 10. As schematically shown in FIG. 2, the bottom of base portion 13 includes a support plate 26 having feet 27 depending downwardly therefrom to support drink-blending machine 10. Support plate 26 carries various components for effecting operation of ice-shaving unit 11 and blender assembly 12. For example, support plate 26 supports an ice-shaver motor 28, a blender motor 29, an electronic control circuitry box 30, and a weighing mechanism generally indicated by the numeral 31. As discussed below, ice-shaver motor 28 drives operation of ice-shaving unit 11, blender motor 29 drives operation of blender assembly 12, and electronic control circuitry box 30 contains circuitry programmed for controlling operation of ice-shaver motor 28 and blender motor 29 according to a signal provided by weighing mechanism 31.

Drink-blending machine 10 produces a frozen drink by supplying a portion of shaved ice to pitcher 18, and, thereafter, mixing the shaved ice with a portion of liquid (possibly including quantity of liquor and flavored drink mix), or other ingredients provided in the pitcher. Herein, the liquid and the other ingredients will be referred to as a "liquid." During operation, drink-blending machine 10 supplies a portion of shaved ice to the pitcher according to a desired liquid-to-ice ratio, and mixes the portion of shaved ice with the portion of liquid. For example, during operation of ice-shaving unit 11, ice-shaver motor 28 moves ice past an ice shaving blade (not shown) to shave the ice provided in ice bin 15, and supply the shaved ice to pitcher 18. Thereafter, during operation of blender assembly 12, blender motor 29 drives a blender blade (not shown) positioned near the bottom of pitcher 18 to mix the shaved ice with the liquid.

If necessary, blender motor 29 is interconnected with the blender blade by a belt (not shown) wound between at least two pulleys. One pulley can be connected to blender motor 29, and the other pulley can be provided under pad 20. The pulley provided under pad 20 is rotatably interconnected with the blender blade when pitcher 18 is positioned on pad 20.

Furthermore, weighing mechanism 31 includes a pedestal 32 positioned on support plate 26. One end of a deflection beam 33 is carried by pedestal 32. Beam 33 is provided with a conventional strain gauge 34 positioned above a recessed or thinned-out area 35 thereof. The other end of beam 33 carries pad 20. As such, the entire weight of pad 20 and pitcher 18 carried by pad 20 is suspended on the end of beam 33. A flap guard 36 is mounted on beam 33. Flap guard 36 extends above strain gauge 34 to protect it from damage by undesired contact. Strain gauge 34 provides a signal proportional to the entire weight of pad 20 and pitcher 18 carried by pad 20 to electronic circuitry control box 30. The signal produced by weighing mechanism 31 is used in operating ice-shaving unit 11 and blender assembly 12.

Electronic control circuitry box 30 includes conventional electronic circuitry containing programming which follows a drink mixing process having both an ice-shaving process controlling ice-shaving unit 11, and a blending process for controlling blender assembly 12. The programming enabling the drink mixing process can, as those skilled in the art will appreciate, be incorporated with or within the conventional electronic circuitry in various forms. To that end, the drink mixing process can be included with the conventional electronic circuitry as firmware or software stored in a memory device (not shown), or it can be embedded within the conventional electronic circuitry.

The conventional electronic circuitry is configured to receive the signal provided by weighing mechanism 31, and the programming enabling the drink mixing process is configured to respond accordingly. For example, according to the signal provided by weighing mechanism 31, ice-shaving process and blending process included with drink mixing process respectively activate ice-shaving unit 11 to supply a portion of shaved ice to pitcher 18 according to the desired liquid-to-ice ratio, and blender assembly 12 to mix the shaved ice with the liquid. In accordance with the present invention, the drink mixing process compensates for dullness or other inconsistency of the blades used in ice-shaving unit 11 by adjusting the speed of ice-shaver motor 28 to maintain the ice-shaving rate within an acceptable range.

Figure 3:
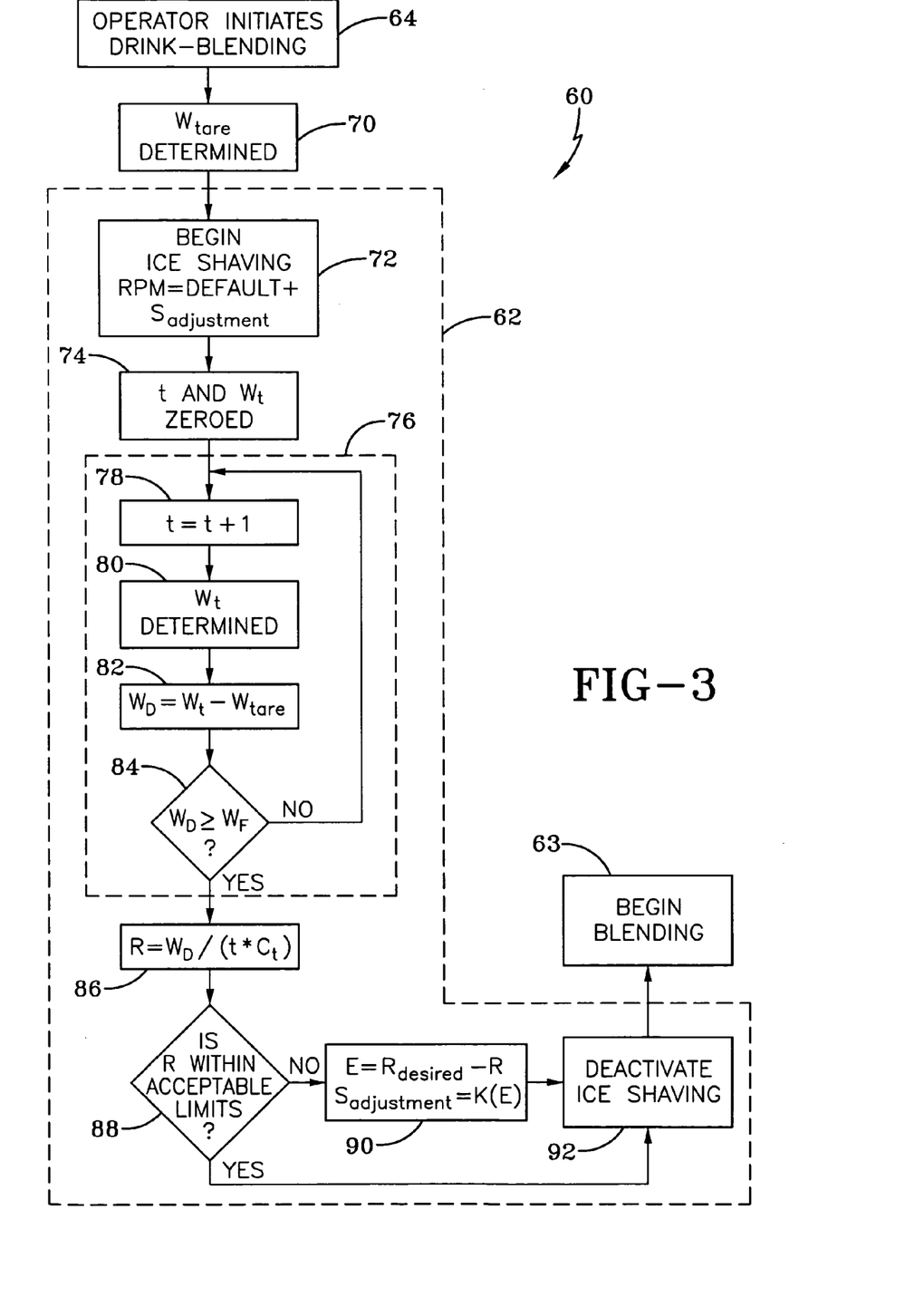
FIG. 3 is a flow-chart depicting one method of operation of the device in accordance with the concepts of the present invention.

One embodiment of the drink mixing process that can be programmed into the conventional electronic circuitry is generally indicated by the numeral 60 in FIG. 3. As seen in FIG. 3, drink mixing process 60 is depicted as a flow chart followed during the operation of drink-blending machine 10. Drink mixing process 60 includes an ice-shaving process 62 and a blending process 63 initiated at various intervals along the flow-chart. Generally, ice-shaving process 62 operates ice-shaving unit 11 to provide a quantity of shaved ice to pitcher 18, and blending process 63 operates to mix the contents (i.e. liquid and shaved ice) of pitcher 18.

Ice-shaving process 62, as seen in FIG. 3, is configured to control the operational speed of ice-shaver motor 28 to ensure that the ice-shaving rate (i.e. the rate at which shaved ice exits ice-shaving unit 11) remains within a specified range. Over time, operation of ice-shaving unit 11 dulls the blades used in shaving the ice, thereby decreasing the ice-shaving rate for a given constant speed of ice-shaver motor 28. As such, ice-shaving process 62 is provided to compensate for any dullness of the blade by adjusting the operational speed of ice-shaver motor 28 to maintain the ice-shaving rate within an acceptable range.

To begin drink blending process 60, the operator initiates operation of drink-blending machine 10 at step 64. Buttons 46 located on the touch pad 45 can be depressed to initiate operation of drink-blending machine 10 at step 64. Different buttons 44 can be associated with different desired liquid-to-ice ratios, and weighing mechanism 31 is used in measuring shaved ice produced by ice-shaving unit 11 to provide those ratios.

The weight of pitcher 18 and liquid contained therein (the tare weight) is determined at step 70 using weighing mechanism 31, and is stored in the memory device of the conventional electronic circuitry as the tare weight ($W_{tare}$). The tare weight ($W_{tare}$) is used in determining whether a specified amount of shaved ice ($W_F$) is produced by ice shaving unit 11 to provide the desired liquid-to-ice ratio.

Once tare weight ($W_{tare}$) is determined, ice-shaving process 62 begins at step 72 to produce shaved ice using ice-shaving unit 11. Ice-shaving process 62 includes capabilities for increasing the operational speed of ice-shaver motor 28 to compensate for the dullness of the blade used in ice-shaving unit 11. As such, the operational speed of ice-shaver motor 28 is set at step 72 to a default speed plus a speed adjustment factor ($S_{adjustment}$). The adjustment factor ($S_{adjustment}$) compensates for dullness of the blades by increasing the speed of ice-shaver motor 28.

After the operational speed of ice-shaver motor 28 has been set, a cycle count (t) and a current sample weight ($W_t$) are zeroed at step 74. Thereafter, ice-shaving process 62 begins a loop 76 which completes various cycles until the specified amount of shaved ice ($W_F$) is produced. After the specified amount of shaved ice ($W_F$) is produced, and the various cycles are completed, an ice-shaving rate (R) is determined, and, if the ice-shaving rate (R) is not within the acceptable range, the adjustment factor ($S_{adjustment}$) is determined.

Initially, during each cycle of loop 76, the cycle count (t) is advanced at step 78 so that t=t+1. At step 80, weighing mechanism 31 is activated to determine the current sample weight ($W_t$) of pitcher 18 and any shaved ice and/or liquid contained therein. At step 82, the tare weight ($W_{tare}$) is subtracted from the current sample weight ($W_t$) to determine the weight difference ($W_D$). Thereafter, the weight difference ($W_D$) is compared to the desired amount of shaved ice ($W_F$) at step 84 to determine whether loop 76 continues. For example, if at step 84 the weight difference ($W_D$) is less than the specified amount of shaved ice ($W_F$), loop 76 continues back to step 78. However, if at step 84 the weight difference ($W_D$) is greater than or equal to the specified amount of shaved ice ($W_F$), loop 76 is discontinued, and drink mixing process 60 continues to step 86.

At step 86, the ice-shaving rate (R) is determined for the total operating time of ice-shaving unit 11 by dividing the weight difference ($W_D$) by the ice-shaving time (T). The ice-shaving time (T) is equivalent to the total operating time of ice-shaving unit 11, and can be determined by multiplying the cycle count (t) by the cycle time ($C_t$), where the cycle time ($C_t$) is equal to time period of each cycle of loop 76, and can be set at or between the 0.0625 and 0.5000 seconds.

Thereafter, at step 88 the ice-shaving rate (R) is compared to the acceptable ice-shaving rates for ice-shaving process 62. As discussed above, ice-shaving process 62 compensates for any dullness or other inconsistency of the blade by adjusting the operational speed of ice-shaver motor 28 to maintain ice-shaving rate within an acceptable range. Therefore, if at step 88 the ice-shaving rate (R) is within the acceptable range, then determining the adjustment factor ($S_{adjustment}$) is unnecessary, ice-shaving process 62 is deactivated at step 92, and, drink blending process 60 continues to blending process 63. However, if at step 88 the ice-shaving rate (R) is not within the acceptable range, then the adjustment factor ($S_{adjustment}$) is determined.

At step 90, the adjustment factor ($S_{adjustment}$) is determined. For any given total operating time of ice-shaving unit 11 (or ice-shaving time (T)), there exists a desired ice-shaving rate ($R_{desired}$). The desired ice-shaving rate ($R_{desired}$), for example, can be an average of the limits of the acceptable range of ice-shaving rates discussed at step 88. Initially, at step 90, the ice-shaving rate (R) is subtracted from the desired ice-shaving rate ($R_{desired}$) to the determine the amount of ice-shaving rate error (E). Thereafter, the adjustment factor ($S_{adjustment}$) is equated with a gain constant (K). The gain constant (K) can, for example, be a fixed value, or be a value associated with the amount of ice-shaving rate error (E). In the later case, the gain constant (K) can be selected from a schedule of predetermined values provided to adjust the operational speed of ice-shaver motor 28 according to the amount of ice-shaving rate error (E).

Once the adjustment factor ($S_{adjustment}$) is determined at step 90, ice-shaving process 62 is deactivated at step 92, and, drink blending process 60 continues to blending process 63. During another use of drink-blending machine 10, the adjustment factor ($S_{adjustment}$) is used at step 72 to adjust the operational speed of ice-shaver motor 28 to compensate for the dullness of the blade of ice-shaving unit 11.

Figure 4:
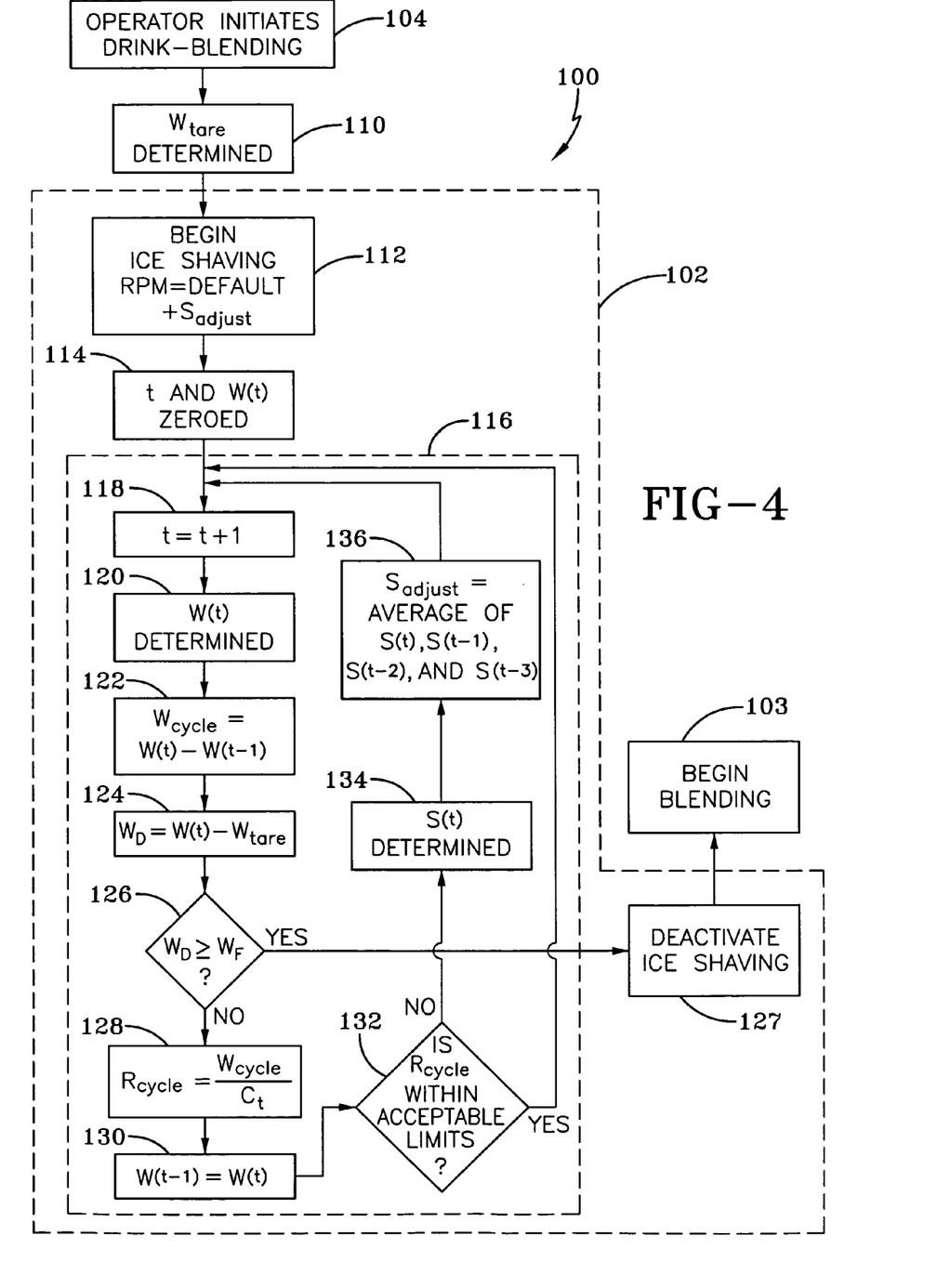
FIG. 4 is a flow-chart depicting another method of operation of the device in accordance with the concepts of the present invention.

Another embodiment of the drink mixing process that can be programmed into the conventional electronic circuitry is generally indicated by the numeral 100 in FIG. 4. Drink mixing process 100 is depicted as a flow chart followed to operate drink-blending machine 10, and includes a ice-shaving process 102 and a blending process 103. Like ice-shaving process 62, ice-shaving process 102, as seen in FIG. 4, is configured to adjust the operational speed of ice-shaver motor 28 according to the ice-shaving rate. In doing so, ice-shaving process 102 compensates for any dullness in the blade used in ice-shaving unit 11, and maintains the ice-shaving rate remains within a specified range. However, unlike ice-shaving process 62, the rate of ice shaving is periodically measured during ice-shaving process 102.

To begin drink blending process 100, the operator initiates operation of drink-blending machine 10 at step 104 by depressing buttons 46 located on touch pad 45. As discussed above, different buttons 44 can be associated with different desired liquid-to-ice ratios, and weighing mechanism 31 is used in measuring shaved ice produced by ice-shaving unit 11 to provide those ratios.

The weight of pitcher 18 and liquid contained therein is determined at step 110 using weighing mechanism 31. The weight determined by weighing mechanism 31 at step 110 is stored in the memory device of the conventional electronic circuitry as the tare weight ($W_{tare}$). The tare weight ($W_{tare}$) is used in determining whether the a specified amount of shaved ice ($W_F$) is produced by ice shaving unit 11 to provide the desired liquid-to-ice ratio.

Once the tare weight ($W_{tare}$) is determined, ice-shaving process 102 begins at step 112 to produce shaved ice using ice-shaving unit 11. As discussed above, ice-shaving process 102 includes capabilities for increasing the operational speed of ice-shaver motor 28 to compensate for dullness of the blade used in ice-shaving unit 11. To that end, the operational speed of ice-shaver motor 28 is set at step 112 to a default speed plus a speed adjustment factor ($S_{adjust}$). The adjustment factor ($S_{adjust}$) compensates for dullness of the blade by increasing the operational speed of ice-shaver motor 28.

After the operational speed of ice-shaver motor 28 has been set, the cycle count (t) and current sample weight (W(t)) are zeroed at step 114. Thereafter, ice-shaving process 102 begins a loop 116 which completes various cycles until the specified amount of shaved ice ($W_F$) is produced. During operation of loop 116, the cycle count (t) and current sample weight (W(t)) are used in measuring an ice-shaving rate per cycle ($R_{cycle}$), which is periodically determined during ice-shaving process 102. Furthermore, during operation of loop 116, various intermediary adjustment factors (S(t)) are calculated if the cycle ice-shaving rate ($R_{cycle}$) is not within the acceptable range.

Initially, during each cycle of loop 116, the cycle count (t) is advanced at step 118 so that t=t+1. At step 120, weighing mechanism 31 is activated to determine the current sample weight (W(t)) of pitcher 18 and any shaved ice and/or liquid contained therein. Thereafter, to determine a cycle weight ($W_{cycle}$), the previous sample weight (W(t-1)) is subtracted from the current sample weight (W(t)) at step 122. As discussed below, the cycle weight ($W_{cycle}$) is used to determine the cycle ice-shaving rate ($R_{cycle}$).

At step 124, the weight difference ($W_D$) between the current sample weight (W(t)) and tare weight ($W_{tare}$) is determined. Thereafter, the weight difference ($W_D$) is compared to the desired amount of shaved ice ($W_F$) at step 126 to determine whether loop 116 continues. For example, if at step 126 the weight difference ($W_D$) is less than the specified amount of shaved ice ($W_F$), loop 116 continues to step 128. However, if at step 126 the weight difference ($W_D$) is greater than or equal to the desired amount of shaved ice ($W_F$), loop 116 is discontinued, ice-shaving process 102 is deactivated at step 127, and drink mixing process 100 continues to blending process 103.

Once it has been determined that the weight difference ($W_D$) is less than the specified amount of shaved ice ($W_F$), the cycle ice-shaving rate ($R_{cycle}$) is determined. To determine the cycle ice-shaving rate ($R_{cycle}$), the cycle weight ($W_{cycle}$) is divided by the cycle time ($C_t$). Each cycle of loop 116 has the same cycle time ($C_t$), and depending on the configuration of loop 116, the cycle time ($C_t$) can be set at or between 0.0625 and 0.5000 seconds. The longer the cycle time ($C_t$), the greater the accuracy of the determination of the cycle ice-shaving rate ($R_{cycle}$).

Once the cycle ice-shaving rate ($R_{cycle}$) is determined, the previous sample weight (W(t-1)) is reset to the current sample weight (W(t)) at step 130 for use in the subsequent cycle of loop 116. Thereafter, it is determined at step 132 whether the cycle ice-shaving rate ($R_{cycle}$) is within the acceptable range. If the cycle ice-shaving rate ($R_{cycle}$) is within the acceptable range, then loop 116 continues. However, if the cycle ice-shaving rate ($R_{cycle}$) is not within the acceptable range, then an intermediary adjustment factor (S(t)) is determined.

At step 134, the intermediary adjustment factor (S(t)) is determined. For any given cycle time ($C_t$), there exists a desired cycle ice-shaving rate ($R_{Dcycle}$). For example, the desired cycle ice-shaving rate ($R_{Dcycle}$) can be an average of the limits of the acceptable range of ice-shaving rates discussed at step 132.

Initially, at step 134, the cycle ice-shaving rate ($R_{cycle}$) is subtracted from the desired ice-shaving rate ($R_{Dcycle}$) to the determine the amount of ice-shaving rate error per cycle (E(t)). Thereafter, the intermediary adjustment factor (S(t)) is equated with a gain constant (K(t)). The gain constant (K(t)) can, for example, be a fixed value, or be a value associated with the amount of ice-shaving rate error per cycle (E(t)). In the later case, the gain constant (K(t)) can be selected from a schedule of predetermined values provided to adjust the operational speed of ice-shaver motor 28 according to the amount of ice-shaving rate error per cycle (E(t)).

The adjustment factor ($S_{adjust}$) is determined at step 136 before beginning another cycle of loop 116. The adjustment factor ($S_{adjust}$) is a rolling average of intermediary adjustment factors (S(t)), (S(t-1)), (S(t-2)), (S(t-3)). Because loop 116 is completed once the weight difference ($W_D$) is greater than the desired amount of shaved ice ($W_F$), the adjustment factor ($S_{adjust}$) is a rolling average of the last four adjustment factors calculated at step 136. During another use of drink-blending machine 10, the adjustment factor ($S_{adjust}$) is used at step 112 to adjust the operational speed of ice-shaver motor 28 to compensate for dullness of the blade of ice-shaving unit 11.

Figure 5:
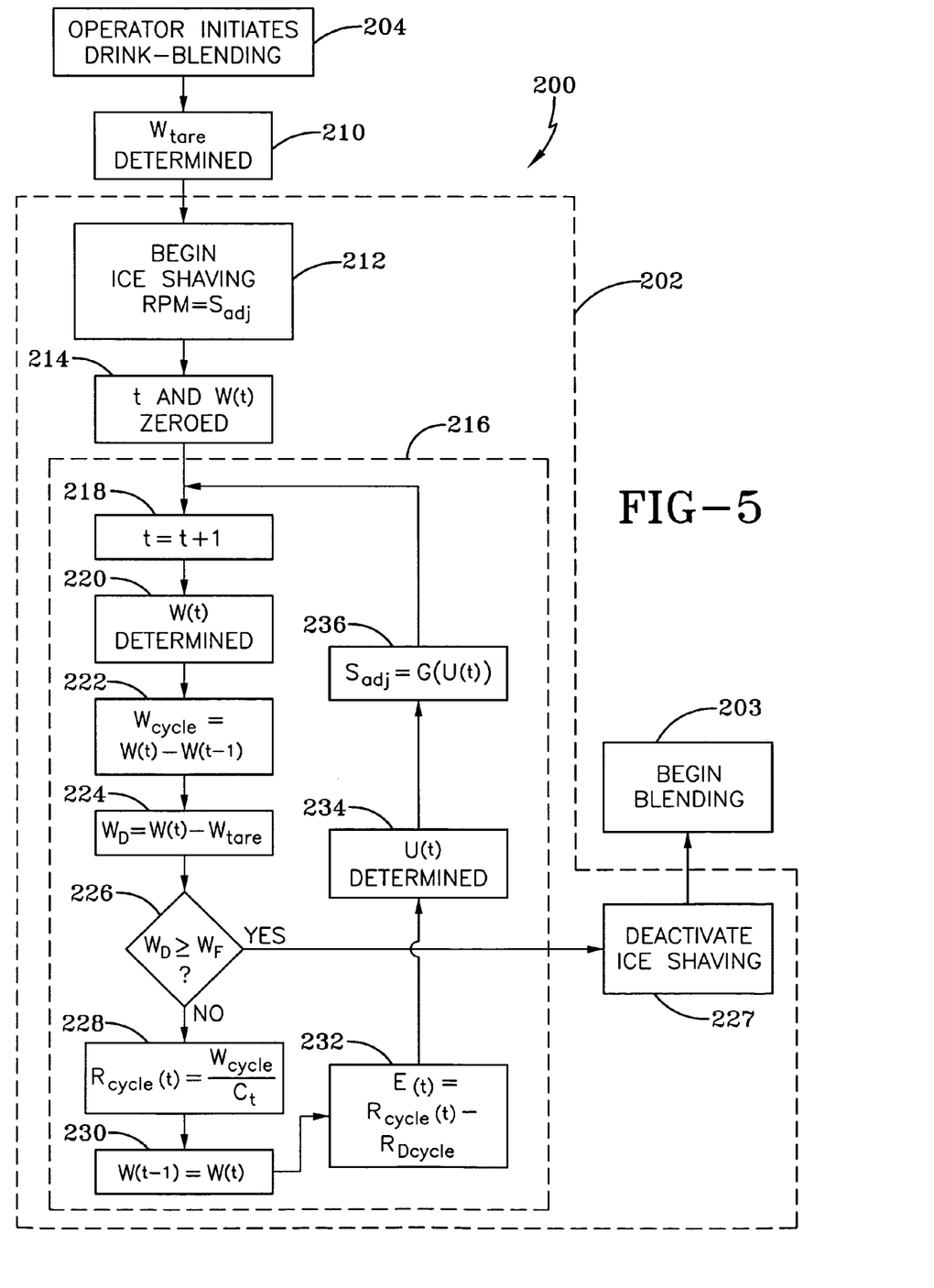
FIG. 5 is a flow-chart depicting another method of operation of the device in accordance with the concepts of the present invention.

Yet another embodiment of the drink mixing process that can be programmed into the conventional electronic circuitry is generally indicated by the numeral 200 in FIG. 5. Drink mixing process 200 is depicted as a flow chart followed to operate drink-blending machine 10, and includes an ice-shaving process 202 and a blending process 203. Ice-shaving process 202 is configured to, if necessary, continually adjust the speed of the ice-shaving motor 28 according to the ice-shaving rate during ice-shaving process 202. In doing so, the ice shaving process 202 compensates in real time for any dullness in the blade used in the ice-shaving unit 11 to maintain the ice-shaving rate within a specified range.

To begin drink blending process 200, the operator initiates operation of drink-blending machine 10 at step 204 by depressing buttons 46 located on touch pad 45. As discussed above, different buttons 44 can be associated with different desired liquid-to-ice ratios, and weighing mechanism 31 is used in measuring shaved ice produced by ice-shaving unit 11 to provide those ratios.

The weight of pitcher 18 and liquid contained therein is determined at step 210 using weighing mechanism 31. The weight determined by weighing mechanism 31 at step 210 is stored in the memory device of the conventional electronic circuitry as the tare weight ($W_{tare}$). The tare weight ($W_{tare}$) is used in determining whether a specified amount of shaved ice ($W_F$) is produced by ice shaving unit 11 to provide the desired liquid-to-ice ratio.

Once the tare weight ($W_{tare}$) is determined, ice-shaving process 202 begins at step 212 to produce shaved ice using ice-shaving unit 11. As discussed above, ice-shaving process 202 includes capabilities for increasing the operational speed of ice-shaver motor 28 to compensate for dullness of the blade used in ice-shaving unit 11 during the operation thereof. To that end, the operational speed of ice-shaver motor 28 is set at step 212 to an adjusted speed ($S_{ADJ}$). The adjusted speed ($S_{ADJ}$) is never less than a specified minimum speed greater than zero, and, as discussed below, can be adjusted to compensate for dullness of the blade by increasing the operational speed of ice-shaver motor 28.

After the operational speed of ice-shaver motor 28 has been set, the cycle count (t) and current sample weight (W(t)) are zeroed at step 214. Thereafter, ice-shaving process 202 begins a loop 216 which completes various cycles until the specified amount of shaved ice ($W_F$) is produced. During operation of loop 216, the cycle count (t) and current sample weight (W(t)) are used in measuring an ice-shaving rate per cycle ($R_{cycle}(t)$), which is periodically determined during ice-shaving process 202. Furthermore, during operation of loop 216, the adjusted speed ($S_{ADJ}$) is adjusted continuously.

Initially, during each cycle of loop 216, the cycle count (t) is advanced at step 218 so that t=t+1. At step 220, the weighing mechanism 31 is activated to determine the current sample weight (W(t)) of pitcher 18 and any shaved ice and/or liquid contained therein. Thereafter, to determine a cycle weight ($W_{cycle}$), the previous sample weight (W(t-1)) is subtracted from the current sample weight (W(t)) at step 222. As discussed below, the cycle weight ($W_{cycle}$) is used to determine the cycle ice-shaving rate ($R_{cycle}(t)$).

At step 224, the weight difference ($W_D$) between the current sample weight ($W(t)$) and tare weight ($W_{tare}$) is determined. Thereafter, the weight difference ($W_D$) is compared to the desired amount of shaved ice ($W_F$) at step 226 to determine whether loop 216 continues. For example, if at step 226 the weight difference ($W_D$) is less than the specified amount of shaved ice ($W_F$), loop 216 continues to step 228. However, if at step 226 the weight difference ($W_D$) is greater than or equal to the desired amount of shaved ice ($W_F$), loop 216 is discontinued, ice-shaving process 202 is deactivated at step 227, and drink mixing process 200 continues to blending process 203.

Once it has been determined that the weight difference ($W_D$) is less than the specified amount of shaved ice ($W_F$), the cycle ice-shaving rate ($R_{cycle}(t)$) is determined at step 228. To determine the cycle ice-shaving rate ($R_{cycle}(t)$), the cycle weight ($W_{cycle}$) is divided by the cycle time ($C_t$). Each cycle of loop 216 has the same cycle time ($C_t$), and depending on the configuration of loop 216, the cycle time ($C_t$) can be set at or between 0.0625 and 0.5000 seconds. The longer the cycle time ($C_t$), the greater the accuracy of the determination of the cycle ice-shaving rate ($R_{cycle}(t)$). Once the cycle ice-shaving rate ($R_{cycle}(t)$) is determined, the previous sample weight ($W(t-1)$) is reset to the current sample weight ($W(t)$) at step 230 for use in the subsequent cycle of loop 216.

At step 232, the amount of ice-shaving rate error per cycle ($E(t)$) is determined. For example, for any given cycle time ($C_t$), there exists a desired cycle ice-shaving rate ($R_{Dcycle}$). The desired cycle ice-shaving rate ($R_{Dcycle}$) is used to maintain the cycle ice-shaving rate ($R_{cycle}(t)$) with a specified range. To determine the cycle ice-shaving rate error ($E(t)$), the cycle ice-shaving rate ($R_{cycle}(t)$) is subtracted from the desired ice-shaving rate ($R_{Dcycle}$).

Thereafter, a feedback response ($U(t)$) is determined at step 234 using the cycle ice-shaving rate error ($E(t)$). The feedback response ($U(t)$) is calculated using Equation (1).

$$U(t)=U(t-1)+K_P[E(t)-E(t-1)]+K_I E(t)+K_D[E(t)-2E(t-1)+E(t-2)] \quad (1)$$

In Equation (1), $K_P$, $K_I$, and $K_D$ are gain constants related to proportional, integral, and derivative gains. By using the gain constants $K_P$, $K_I$, and $K_D$ in Equation (1), the feedback response ($U(t)$) is modified to drive the cycle ice-shaving rate ($R_{cycle}(t)$) to zero. Thereafter, the feedback response ($U(t)$) is used in adjusting the adjusted speed ($S_{ADJ}$).

At step 236, the adjusted speed ($S_{ADJ}$) is adjusted according to the feedback response ($U(t)$) as a function of a plant equation ($G(U(t))$), where the plant equation ($G(U(t))$) is a non-linear equation related to the operational characteristics of ice-shaver motor 28. Plant equation ($G(U(t))$) is not known mathematically, but is provided to adjust the adjusted speed ($S_{ADJ}$) appropriately according to the feedback response ($U(t)$). Subsequently, the adjusted speed ($S_{ADJ}$) is used to control the speed of ice-shaver motor 28 as the loop 216 continues. As such, during operation of the ice-shaving process 102, the adjusted speed ($S_{ADJ}$) can be continually adjusted according to the cycle ice-shaving rate error ($E(t)$) as modified by the feedback response ($U(t)$) to compensate in real time for any dullness in the blade.

Thus, it should be evident that the methods for controlling the blending of drinks disclosed herein constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A method of operating a drink-blending machine to change the operational speed of an ice-shaver motor comprising the steps of:
    initiating operation of an ice-shaving process;
    providing shaved ice to a pitcher;
    setting the operational speed of the ice-shaver motor to a default speed plus a potential adjustment factor;
    determining an ice-shaving rate for the ice-shaving process;
    if the ice-shaving rate is not within a specified range, then determining the adjustment factor; and
    using the adjustment factor in repeat operations of the drink-blending machine.

2. A method of operating a drink-blending machine according to claim 1, further comprising the steps of:
    before said step of providing shaved ice to the pitcher, determining a tare weight for the pitcher and liquid contained therein;
    after said step of providing shaved ice to the pitcher, if a weight difference is not greater than or equal to a specified weight of shaved ice, then iteratively performing the following steps a and b:
    a. determining a current sample weight;
    b. subtracting the tare weight from the current sample weight to determine the weight difference; and
    deactivating the ice-shaving process.

3. A method of operating a drink-blending machine according to claim 2, further comprising the steps of:
    initiating operation of a blending process after said step of deactivating the ice-shaving process.

4. A method of operating a drink-blending machine to change the operational speed of an ice-shaver motor comprising the steps of:
    initiating operation an ice-shaving process;
    providing shaved ice to a pitcher;
    setting the operational speed of the ice-shaver motor to a default speed plus an adjustment factor;
    iteratively repeating steps a, b, c, and d until a weight difference is greater than a specified weight of shaved ice;
    a. determining an ice-shaving rate per cycle;
    b. determining a current sample weight;
    c. subtracting the tare weight from the current sample weight to determine the weight difference;
    d. if the ice-shaving rate per cycle is not within a specified range, then determining an intermediary adjustment factor;
    determining the adjustment factor using the intermediary adjustment factors;
    using the adjustment factor in repeat operations of the drink-blending machine; and
    deactivating the ice-shaving process.

5. A method of operating a drink-blending machine according to claim 4, further comprising:
    initiating operation of a blending process after said step of deactivating the ice-shaving process.

6. A method of operating a drink-blending machine to change the operational speed of an ice-shaver motor comprising the steps of:
- initiating operation an ice-shaving process;
- providing shaved ice to a pitcher;
- setting the operational speed of the ice-shaver motor;
- iteratively repeating steps e, f, g, and h until a weight difference is greater than a specified weight of shaved ice:
- e. determining an ice-shaving rate per cycle;
- f. determining a current sample weight;
- g. subtracting the tare weight from the current sample weight to determine the weight difference;
- h. continually adjusting the operational speed of the ice-shaver motor according to an amount of ice-shaving rate error per cycle;
- deactivating the ice-shaving process.

7. A method of operating a drink-blending machine according to claim 6, further comprising the step of:
- before continually adjusting the operational speed of the ice-shaver motor, determining the amount of ice-shaving rate error per cycle by subtracting the ice-shaving rate per cycle from a desired cycle ice-shaving rate.

8. A method of operating a drink-blending machine according to claim 7, wherein the step of continually adjusting the operational speed of the ice-shaver motor minimizes the amount of ice-shaving rate error per cycle.

9. A method of operating a drink-blending machine according to claim 8, further comprising:
- initiating operation of a blending process after said step of deactivating the ice-shaving process.

* * * * *